(12) United States Patent
Groleau

(10) Patent No.: US 9,074,956 B2
(45) Date of Patent: Jul. 7, 2015

(54) INTERMEDIATE CONNECTOR

(71) Applicant: Michael Raymond Groleau, Traverse City, MI (US)

(72) Inventor: Michael Raymond Groleau, Traverse City, MI (US)

( * ) Notice: Subject to any disclaimer, the term of this patent is extended or adjusted under 35 U.S.C. 154(b) by 0 days.

(21) Appl. No.: 14/263,038

(22) Filed: Apr. 28, 2014

(65) Prior Publication Data

US 2014/0318261 A1    Oct. 30, 2014

Related U.S. Application Data

(60) Provisional application No. 61/817,354, filed on Apr. 30, 2013.

(51) Int. Cl.
*G01B 7/16*    (2006.01)
*G01L 19/00*    (2006.01)

(52) U.S. Cl.
CPC .................................. *G01L 19/0061* (2013.01)

(58) Field of Classification Search
CPC ...... G01L 19/0061; G01L 19/00; B29C 45/76
USPC ............................................ 73/760, 774, 855
See application file for complete search history.

(56) References Cited

U.S. PATENT DOCUMENTS

| | | | | |
|---|---|---|---|---|
| 5,472,331 | A | * | 12/1995 | Watkins ........................ 425/149 |
| 5,902,525 | A | * | 5/1999 | Hettinga ....................... 264/40.1 |
| 2008/0152747 | A1 | * | 6/2008 | Feick .............................. 425/144 |
| 2012/0217668 | A1 | * | 8/2012 | Catoen et al. ................ 264/40.3 |
| 2014/0291042 | A1 | * | 10/2014 | Tsutaya et al. ................ 177/211 |

* cited by examiner

*Primary Examiner* — Max Noori

(57) ABSTRACT

An unshielded strain gage sensor cable that is tightly sealed within an injection mold to prevent electromagnetic interference from interfering with the sensor signal. The use of the unshielded cable significantly reduces the cost and allows for quick installation and a mobility that does not exist with shielded cables.

15 Claims, 1 Drawing Sheet

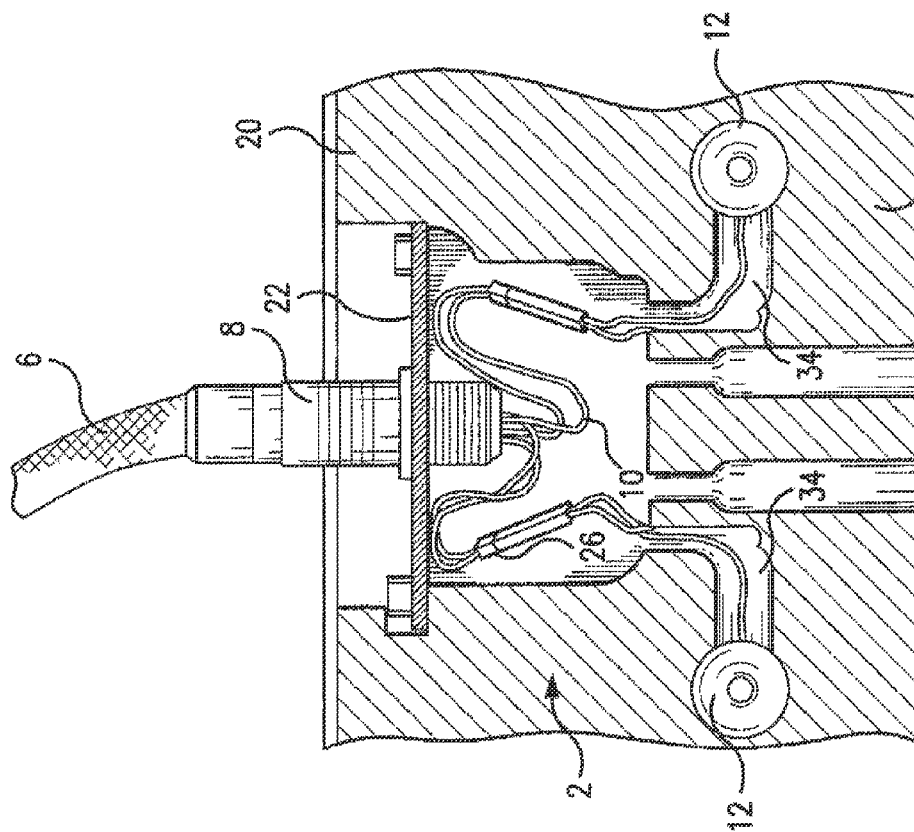
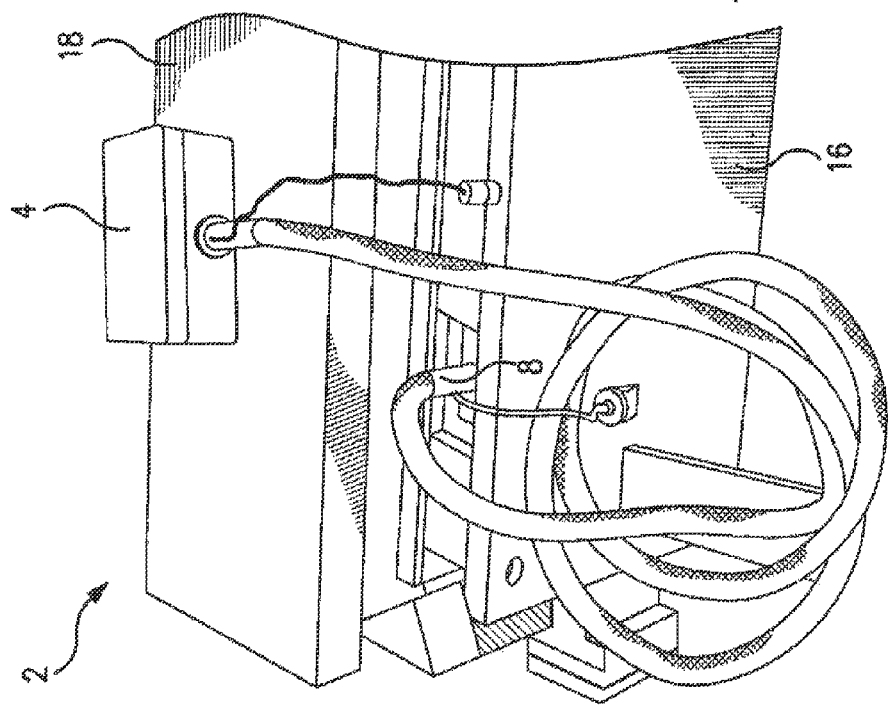
FIG. 1
FIG. 2

INTERMEDIATE CONNECTOR

BACKGROUND OF THE INVENTION

In injection molding applications, cavity pressure sensors are used to provide process data to facilitate improvement in part quality and to detect quality defects automatically. Cavity pressure sensors consist of a sensor body, which creates an electrical signal from an applied force. They also include a cable which transfers that electrical signal to the signal conditioning unit. Signal conditioning, which amplifies the analog electrical signal, and in some instances converts the electrical signal to a digital signal to be read into a computerized process monitor or controlling device.

Cavity sensing for injection molding is based on two technologies, piezoelectric and strain gage sensors. In the piezoelectric sensors, the sensor body creates an electric charge, measured in Pico Coulombs, which is carried to the signal conditioning via a two conductor coaxial cable. For nearly a decade, piezoelectric sensors have been available with multichannel connectors. The advantage of these multichannel connectors is a single connection point that allows multiple sensors to be attached to their respective signal conditioning units. This reduces the space required on the side of the mold, the number of cables required for connection to the signal conditioning, and the complexity involved with matching multiple sensors to their respective signal conditioning units.

Also, in many injection molding sensor applications, signal conditioning is mounted directly on the side of the mold. While this provides certain advantages, it subjects the signal conditioning to high heat, shock, and impact on some molds, which can permanently damage the signal conditioning unit. With multichannel connectors, signal conditioning units can be mounted away from the heat and shock of the mold, while utilizing only a single connecting cable from the mold to the signal conditioning.

Strain gage sensors, on the other hand, require cables with four conductors: two of the connectors providing excitation voltage and two that carry the millivolt signal. These sensors have integral cables, which in most cases are permanently attached to the signal conditioning unit. Customers would like to be able to use multichannel connectors in strain gage sensor applications, but this has been limited by the following technological challenges.

First, in the strain gage sensors, the millivolt signal carried by the cable requires electronic shielding to prevent signal noise from, being introduced by stray electromagnetic interference (EMI). EMI is a particular problem in injection molding environments, and strain gage sensors for molding applications have historically required shielding to prevent signal noise.

Secondly, the multichannel connector requires connection points for the sensor to attach to the multichannel connector. Because of the higher number of conductors, it is difficult to find a connector that is small enough to fit onto a multichannel connector. A major limiting factor in the size of the connector is the metal shell which is normally used to provide shielding against electronic noise.

Also it is difficult to find a shielded connector that reliably carries the cable's shield through when connected.

Finally, a connectors that meet both size and shielding constraints are extremely expensive.

The present invention overcomes all of these challenges through the use of unshielded cables and connectors inside the mold. By removing the shielding, the inventors herein have discovered that smaller, less expensive connectors can be used to attach individual strain gage sensors to a multichannel connector. Also, in order to prevent introduction of signal noise due to EMI, it was discovered that signal noise reduction is accomplished by tightly enclosing the unshielded cables and connectors within a tightly sealed shielding enclosure inside the mold. Here, the mold and the multichannel connector, tightly sealed, provide this shielding. A shielded extension cable, with its shield tied 360° to the multichannel connector, is then used to carry the signal to the signal conditioner, which can be mounted on or off of the mold, away from heat and shock.

THE INVENTION

The present invention is a cavity strain gage sensor configuration for use in an injection mold comprising the following, a strain gage sensor, a signal conditioner and an intermediate connector mounted on the side, of the mold and providing a tight, electronically shielded enclosure. There is also an unshielded cable and unshielded connectors for the cable installed within the electronically shielded enclosure that connects the strain gage to the intermediate connectors. There is also a shielded extension cable connecting the intermediate connector to said signal connector where the 360° shield is carried through its connectors and tied to the intermediate connector and the signal conditioner case.

BRIEF DESCRIPTION OF THE DRAWINGS

FIG. 1 shows a portion of an injection mold equipped with the intermediate connector of this invention.

FIG. 2 shows the intermediate connector without a cover plate, mounted to an injection mold.

DETAILED DESCRIPTION OF THE DRAWINGS

FIG. 1 shows an injection mold 14 equipped with the intermediate connector 2. The injection mold 14 has the multichannel signal conditioner 4 sitting on the top surface 18 of the injection mold 14. The intermediate connector 2 is mounted within the ejector plate 20 of the mold 14 and covered by a mold cover plate 22. Further, the intermediate connector 2 is in close contact with the ejector plate 20 and the mold cover plate 22 so that the three components form a tightly shielded enclosure within the mold. The intermediate connector 2 is connected to the multichannel signal conditioner 4 via a shielded cable 6. The shielded cable 6 that is outside of the injection mold 14 has to be shielded to prevent electromagnetic interference. The electromagnetic interference creates poor quality in signal transmission. With the intermediate connector 2 incorporated into the ejector plate 20 and tightly enclosed by the cover plate 22, one can measure the amount of plastic pressure inside the mold 14 during the injection process and clearly transmits the signal to the signal conditioner 4. Also shown is the mold cover plate 16.

FIG. 2 shows the intermediate connector 2 mounted to an injection mold 14 without a mold cover plate 22. This Figure shows the shielded cable 6 that, connects the multichannel signal conditioner 4 to the intermediate connector 2. The shielded cable 6 runs from the multichannel signal conditioner 4, where it is connected to unshielded cable 10, that is tightly sealed within the injection mold 14. The unshielded cable 10 extends from the intermediate connector 2 to the strain gage sensor 12 (for example, a Wheatstone Bridge) inside of the sensor pocket 34. Full, one-half, and one-quarter Wheatstone bridges can be used to an advantage in this invention. An unshielded connector 26 is installed part way along the length of the unshielded cable 10, and allows the strain gage sensor 12 to be removed from the intermediate connector 2. Once the connections are made the mold cover plate 16 is replaced.

It has been discovered that placing the unshielded cables 10 tightly sealed within the injection mold 14 prevents electromagnet interference. This blocking of the electromagnetic interference makes it possible to use much less expensive unshielded cable 10 to transmit the signal to the shielded cable 6 and the multichannel signal conditioner 4. This step significantly reduces the cost and allows for quick inexpensive reconfiguration of the unshielded cables 10.

It has also been discovered that the mold 14 prevents the electromagnetic interference, resulting in a quality signal. The reduction in expense coupled with the quality signal provides clear advantages over all other prior art.

What is claimed is:

1. A cavity strain gage sensor configuration for use in an injection mold comprising:
   i. a strain gage sensor;
   ii. a signal conditioner;
   iii. an intermediate connector mounted on the side of the mold and providing a tight electronically shielded enclosure;
   iv. an unshielded cable and unshielded connectors for said cable installed within said electronically shielded enclosure, connecting said strain gage sensor to said intermediate connectors;
   v. a shielded extension cable connecting said intermediate connector to said signal connector, where the 360° shield is carried through its connectors and tied to said intermediate connector and said signal conditioner case.

2. A sensor configured according to claim 1 wherein said strain gage sensor utilizes a full Wheatstone bridge sensor element.

3. A sensor configured according to claim 1 wherein said strain gage sensor utilizes a half Wheatstone bridge sensor element.

4. A sensor configured according to claim 1 wherein said strain gage sensor utilizes a quarter Wheatstone bridge sensor element.

5. A sensor configuration according to claim 3 wherein said Wheatstone bridge completion circuitry is located in said unshielded connector.

6. A sensor configuration according to claim 4 wherein said Wheatstone bridge completion circuitry is located in said unshielded connector.

7. A sensor configuration according to claim 1 wherein a plurality of strain, gage sensors are attached to said intermediate connector using said unshielded cables and unshielded connectors.

8. A sensor configuration according to claim 1 wherein said excitation signal for said plurality of sensors is provided by common wires in said shielded extension cable.

9. A cavity strain gage sensor configuration for use in injection molds comprising:
   i. a strain gage;
   ii. a signal conditioner mounted on the side of the mold and providing a tight electronically shielded enclosure
   iii. an unshielded cable and an unshielded connectors for said cable installed within said electronically shielded enclosure, connecting said strain gage to said signal connector, said unshielded cables and connectors, being shielded inside an enclosure inside of a mold.

10. A sensor configuration according to claim 9 wherein said strain gage sensor utilizes a full Wheatstone bridge sensor element.

11. A sensor configuration according to claim 9 wherein said strain gage sensor utilizes a half Wheatstone bridge sensor element.

12. A sensor configuration according to claim 9 wherein the strain gage sensor utilizes a quarter Wheatstone bridge sensor element.

13. A sensor configuration according to claim 11 wherein the Wheatstone bridge completion circuitry is located in said unshielded connector.

14. A sensor configuration according to claim 12 wherein the Wheatstone bridge completion circuitry is located in said unshielded connector.

15. A sensor configuration according to claim 9 wherein a plurality of strain gage sensors are attached to said intermediate connector using said unshielded cables and unshielded connectors.

* * * * *